United States Patent
Suzumura

[11] Patent Number: 6,166,534
[45] Date of Patent: Dec. 26, 2000

[54] METHOD AND APPARATUS FOR MEASURING THE WHEEL SPEED

[75] Inventor: Michiaki Suzumura, Hamakita, Japan

[73] Assignee: Nisshinbo Industries, Inc., Tokyo, Japan

[21] Appl. No.: 09/148,319

[22] Filed: Sep. 4, 1998

[30] Foreign Application Priority Data

Sep. 5, 1997 [JP] Japan ................................ 9-257743

[51] Int. Cl.$^7$ ........................................................ G01P 3/48
[52] U.S. Cl. ............................................ 324/166; 324/179
[58] Field of Search ............................ 324/179, 166; 361/236, 239; 307/106

[56] References Cited

U.S. PATENT DOCUMENTS 4,876,650  10/1989  Kubo ............................. 364/426.02
5,471,361  11/1995  Wootton ............................ 361/236
5,606,252   2/1997  Gschossmann et al. ............ 324/166

*Primary Examiner*—Christine K. Oda
*Assistant Examiner*—Henry A. Andersen
*Attorney, Agent, or Firm*—Arent Fox Kintner Plotkin & Kahn, PLLC

[57] ABSTRACT

A method and device for calculating vehicle wheel speed which counts either one of the rise or the fall of each one of the pulse signals of the wheel sensor when the wheel speed is higher than a certain amount and counts both the rise and the fall of the pulse signals when the wheel speed is lower than the certain amount. This invention reduces the calculation time for the vehicle wheel speed.

5 Claims, 3 Drawing Sheets

|  |  | COUNTING MEANS AT THE END OF THE PREVIOUS CYCLE | |
|---|---|---|---|
|  |  | WHOLE COUNTING MEANS | HALF COUNTING MEANS |
| COUNTING MEANS AT THE END OF THE CURRENT CYCLE | HALF COUNTING MEANS | N-1 | N-1 |
|  | WHOLE COUNTING MEANS | N | N+1 |

METHOD AND APPARATUS FOR MEASURING THE WHEEL SPEED

BACKGROUND OF THE INVENTION

This invention relates to a method and an apparatus for calculation of wheel speed when using a wheel speed sensor.

Traditionally, wheel speed has been determined by counting the timing of both the rise and the fall of the pulse signals from the wheel speed sensor.

However, counting the timing of both the rise and the fall of the pulse signals requires unnecessary counting for determining wheel speed when the vehicle is driving at a higher speed. This counting process is done for each wheel. This is a waste of time.

OBJECTS AND SUMMARY OF THE INVENTION

An object of the invention is to reduce the calculation time for determining wheel speed.

The first aspect of the invention is a method for measuring wheel speed for a vehicle brake control device using a wheel speed sensor to produce signals proportional to the wheel speed and an electronic control device for calculating the wheel speed based on the signals from the wheel speed sensor, wherein the wheel speed is calculated by counting either the rise or the fall of each of the pulse signals of the wheel speed sensor when the wheel speed is higher than a certain amount, counting both the rise and the fall of each of the pulse signals of the wheel speed sensor when the wheel speed is lower than the certain amount, and determining wheel speed from the number of counts.

In addition, the method as above can further comprise correcting the number of counts by comparing the counting of the previous cycle and the current cycle and by determining the product of rectilinear distance of the wheels relating to one count of the current cycle and the corrected number of counts.

The second aspect of the invention is a wheel speed measuring apparatus for a vehicle brake control device, the vehicle brake control device including a wheel speed sensor mounted to produce signals proportional to the wheel speed and an electronic control device for calculating the wheel speed based on the signals from the wheel speed sensor, the apparatus comprising: a half counting means to count either the rise or the fall of each one of the pulse signals of the wheel speed sensor, a whole counting means to count both the rise and the fall of each one of the pulse signals of the wheel speed sensor, and a switching means to switch between the half counting means and the whole counting means, wherein the wheel speed is calculated based on the signals from the wheel speed sensor by switching to the half counting means when the wheel speed is higher than a certain amount and switching to the whole counting means when the wheel speed is lower than the certain amount.

The third aspect of the invention is a wheel speed measuring apparatus for a vehicle brake control device, the vehicle brake control device including a wheel speed sensor mounted to produce signals proportional to the wheel speed and an electronic control device for calculating the wheel speed based on the signals from the wheel speed sensor, the apparatus comprising: a half counting means to count either the rise or the fall of each one of the pulse signals of the wheel speed sensor, a whole counting means to count both the rise and the fall of each one of the pulse signals of the wheel speed sensor, and a switching means to switch between the half counting means and the whole counting means, wherein the switching means switches to the whole counting means at the first count after the starting point of the calculation cycle, and the switching means switches to the half counting means which counts signals whose direction is constant with the rise or the fall of the pulse signals counted last in the Previous calculation cycle, when the number of counts becomes more than a certain number in the current calculation cycle and switches back to said whole counting means when the number of counts becomes less than the certain number.

The fourth aspect of the invention is a wheel speed measuring apparatus as above wherein the wheel speed is calculated by correcting the number of counts by the counting means of the previous cycle and the current cycle and by determining the product of rectilinear distance of the wheels relating to one count of the current cycle and the corrected number of counts.

BRIEF DESCRIPTION OF DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

An embodiment of the invention is explained with reference to the specific figures.

Figure 1:
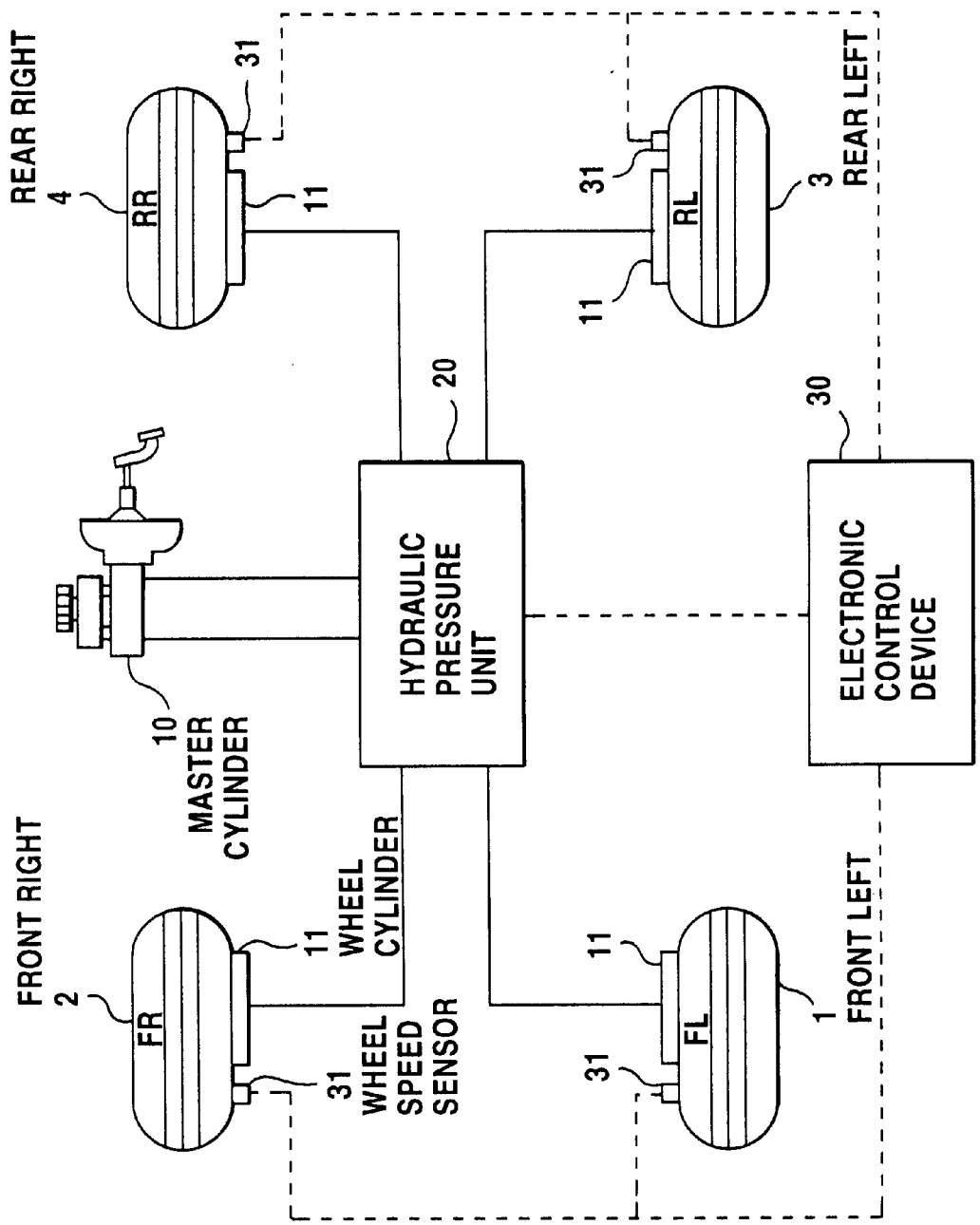
FIG. 1 is a schematic view of a brake control system in which the present invention can be embodied.

As shown in FIG. 1, a wheel speed sensor 31 is arranged adjacent to each respective wheel (front right wheel 2, front left wheel 1, rear right wheel 4, rear left wheel 3) to detect wheel rotation. Signals from the wheel speed sensors 31 are input in the electronic control device 30. The electronic control device 30 processes a plurality of signals from the brake control system such as from each wheel speed sensor 31 to determine necessary parameters such as wheel speed and estimated vehicle speed in order to operate a particular set of functions, e.g., traction control (TCS), vehicle behavior control, anti-lock brake control (ABS), etc.

In anti-lock brake control, when the brake is applied, brake fluid is supplied from a master cylinder 10 to wheel cylinders 11 via a hydraulic pressure unit. In this manner, braking is effectuated. At that time, the electronic control device 30 examines the condition of wheel slippage from the vehicle wheel speed and the estimated vehicle speed. When a wheel is slipping, the hydraulic pressure unit 20 is controlled to conduct the most effective brake fluid pressure control relating to that respective wheel. The electronic control device 30 may be an exclusive hard device, a normal computing device such as microcomputer, etc.

Processing Signals from a Wheel Speed Sensor

Figure 2:
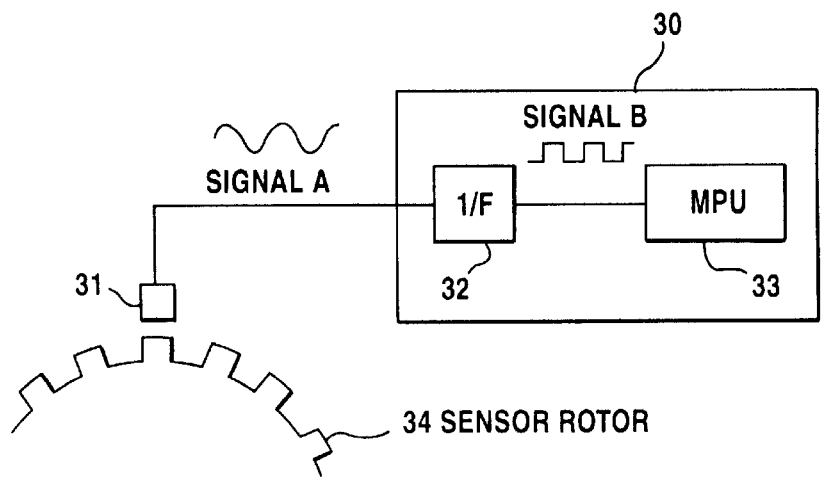
FIG. 2 is an explanation view of a vehicle speed sensor and an electronic control device for the processing of the signals according to the present invention.

As shown in FIG. 2, the wheel speed sensor 31 detects the convex and concave portions of a sensor rotor 34 rotating with the wheel and outputs the signal A as a sine curve-like wave. When the signal A is input in the interface circuit (I/F) 32, the waveform is formed into pulse signals B. The wheel speed is determined in the microprocessing unit (MPU) 33 from waveformed pulse signals B by counting the number of pulses. The interface circuit 32 may be arranged in any one of various locations, such as being arranged in the electronic control device 30 with the MPU 33.

Processing Signals at a Lower Wheel Speed

Figure 3:
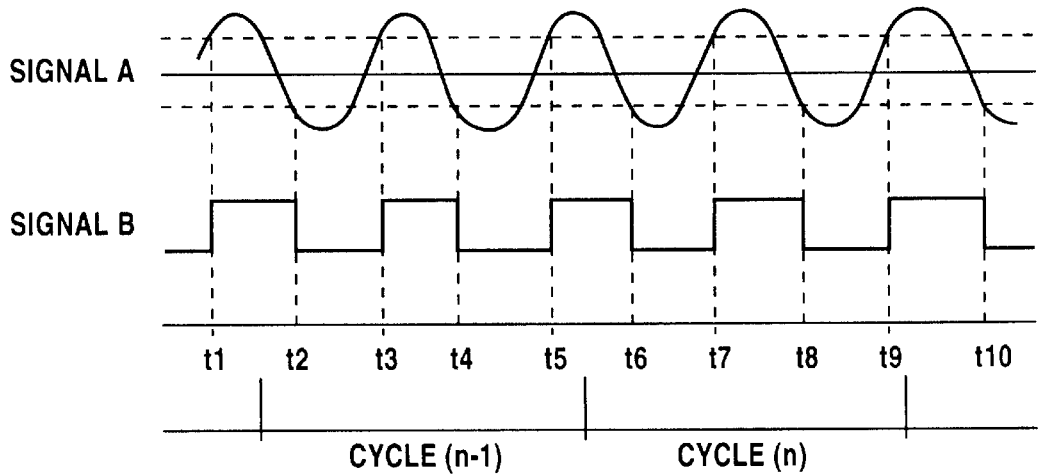
FIG. 3 is an explanation view of the processing of the waveform with the vehicle at a lower speed.

As shown in FIG. 3, the frequency of the signal A becomes lower at a lower wheel speed, which can create an irregular pulse, thereby preventing an accurate wheel speed calculation.

Thus, the number of counts is increased by counting both the rise and the fall of each one of the pulses of signal B.

Accordingly, four signals (t2–t5) during the calculation cycle (n–1) and four signals (t6–t9) during the calculation cycle (n) are measured. If either the rise or the fall is counted, the number of signals becomes one-half, which creates the measurement differences.

Processing Signals at a Higher Wheel Speed

Figure 4:
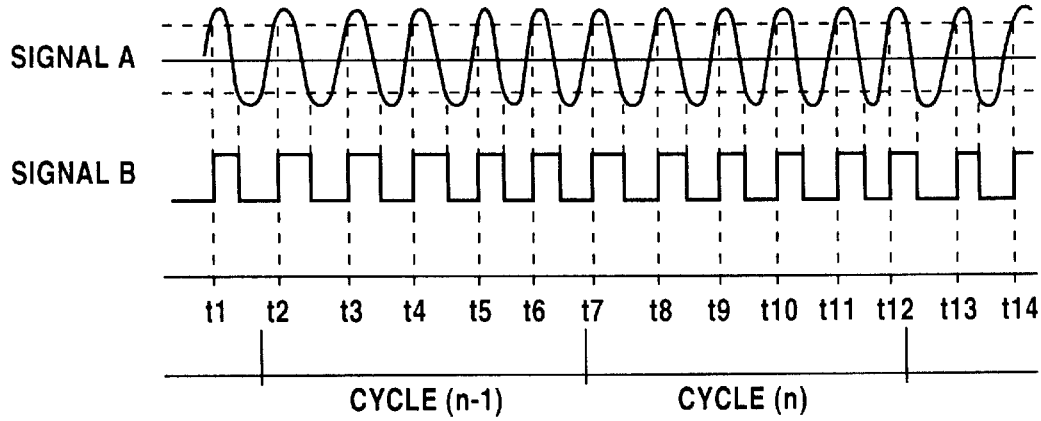
FIG. 4 is an explanation view of the processing of the waveform with the vehicle at a higher speed.

As shown in FIG. 4, the frequency of the signal A becomes higher at a higher wheel speed. The number of counts per unit hour becomes more than necessary for accurately determining the vehicle wheel speed. This, in turn, requires more calculation time for the electronic control, thereby creating a waste of calculation time.

Accordingly, either the rise or the fall of each one of the pulse signals B is counted to reduce the number of the counts for the reduction of the calculation processing time.

By counting as above, five signals (t2–t6) during the calculation cycle (n–1), and six signals (t7–t12) during the calculation cycle (n) are measured. If both the rise and the fall of each pulse are counted, the number of signals is doubled, which increases the processing time. This is done at every wheel.

A Whole Counting Means and a Half Counting Means

The MPU 33 comprises a whole counting means to count both the rise and the fall of each of the pulse signals, a half counting means to count either the rise or the fall of each of the pulse signals, and a switching means to switch between the two counting means.

First Embodiment of Switching the Counting Means

The MPU 33 detects speeds such as the current vehicle wheel speed and switches to the whole counting means when at a lower speed than a certain speed but switches to the half counting means when at a higher than the certain speed.

This certain speed is determined by a sensor rotor, a vehicle wheel speed sensor, a diameter of the tire, etc. For instance, when one cycle of the pulse B represents four centimeters of rectilinear motion of the vehicle, the switching means will switch between counting means at 10–20 kilometer per hour.

Second Embodiment of Switching the Counting Means

Figures 5, 6:
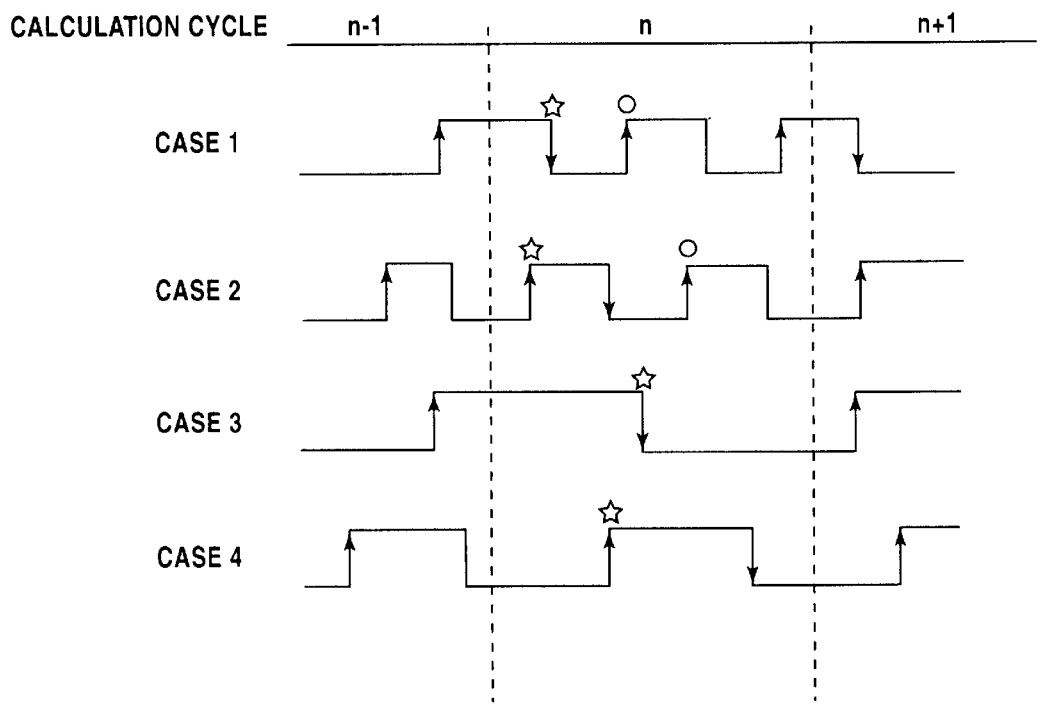
FIG. 5 is an explanation view showing switching of the counting means according to the present invention.
FIG. 6 is an explanation view of a correction table of the processing of the number of the counts.

The switching means may be made to switch based on the number of counts of the calculation cycle (n). In FIG. 5, the switching means switch to the whole counting means to count both the rise and the fall of each of the pulse signals when at the first count after the starting point of the respective calculation cycle (starting points of the rise or the fall of the pulse shown as *). When the number of counts becomes more than certain amount in the particular calculation cycle n, the means may be switched to the half counting means. The certain amount in FIG. 5 is 2.

For instance, the half counting means counts signals whose direction is constant with the rise or the fall pulse signals counted last in the calculation cycle. That is, the signal is constant with the rise or the fall pulse signals if the rise in the same direction is counted when the last count of the previous calculation cycle is a rise, and the fall in the same direction is counted when the last court of the previous calculation cycle is a fall. Also, when the last count of the previous calculation cycle counts is a rise, a fall in the opposite direction is counted, and when the last count of the previous calculation cycle counts is a fall, the rise in the opposite direction is counted. In either case 1 or 2 (cases 1–4 being shown in FIG. 5, the same directions), since the previous calculation cycle (n–1) has finished by counting a rise, the means may be switched to the half counting means at the rise (the rise with the sign 0). However, the cases 3 and 4 are not set so as to switch to the half counting means.

Calculation of Rectilinear Distance

The rectilinear distance L of travel of the vehicle during one calculation cycle is determined by correcting the number of actual counts according to the correction table in FIG. 6. In case 1, $L=(N-1)\times 2a$, since the previous cycle finishes with the whole counting means and the current cycle finishes with the half counting means. Here, N is the number of counts in the current cycle, and a is the rectilinear distance of travel of the vehicle during one count in the whole counting means. The rectilinear distance at one count in the half counting means should be 2a. Accordingly, from FIG. 5, the case 1 is $L=(3-1)\times 2a$.

Similarly, in case 2, $L=(N-1)\times 2a$, since the previous cycle finished with the half counting means and the current cycle finishes with the half counting means. Thus, from FIG. 5, $L=(3-1)\times 2a$. In case 3, $L=N\times a$, since both previous and current cycles use the whole counting means. Thus, from FIG. 5, $L=(1)\times a$. In case 4, $L=(N+1)\times a$ since the previous cycle finishes with the half counting means, and the current cycle finishes with the whole counting means. Thus, from FIG. 5, $L=(2+1)\times a$.

Effect of the Invention

This invention has the following effect. This invention not only maintains the resolving power of the wheel speed calculation result at the lower speed but also reduces the calculation time at the higher speed.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A method for measuring wheel speed for a vehicle brake control device of a vehicle using a wheel speed sensor to produce signals proportional to the wheel speed and an electronic control device for calculating the wheel speed based on the signals from said wheel speed sensor, wherein the wheel speed is calculated by counting either the rise or the fall of each of the pulse signals of said wheel speed sensor when the wheel speed is higher than a certain amount, and counting together both the rise and the fall of each of the pulse signals of said wheel speed sensor when the wheel speed is lower than the certain amount.

2. The method as claimed in claim 1, wherein the wheel speed is calculated by correcting the number of counts in the current cycle from the counting of the previous cycle and the current cycle and by multiplying a rectilinear distance of the vehicle relating to one count of the current cycle by the corrected number of counts when said wheel speed is lower than the certain amount and multiplying a doubled rectilinear distance of the vehicle relating to one count of the current cycle by the corrected number of counts when said wheel speed is higher than the certain amount.

3. A wheel speed measuring apparatus for a vehicle brake control device, said vehicle brake control device including a wheel speed sensor mounted to produce signals proportional to the wheel speed and an electronic control device for calculating the wheel speed based on the signals from said wheel speed sensor, said apparatus comprising a half counting means to count either the rise or the fall of each one of the pulse signals of said wheel speed sensor, a whole counting means to count together both the rise and the fall of each one of the pulse signals of said wheel speed sensor, and a switching means to switch between said half counting means and said whole counting means by switching to said half counting means when the wheel speed is higher than a certain amount and switching to said whole counting means when the wheel speed is lower than the certain amount, wherein the wheel speed is calculated based on the signals from said wheel speed sensor by switching to said half counting means when the wheel speed is higher than a certain amount and switching to said whole counting means when the wheel speed is lower than the certain amount.

4. A wheel speed measuring apparatus for a vehicle brake control device, said vehicle brake control device including a wheel speed sensor mounted to produce signals proportional to the wheel speed and an electronic control device for calculating the wheel speed based on the signals from said wheel speed sensor, said apparatus comprising a half counting means to count either the rise or the fall of each one of the pulse signals of said wheel speed sensor, a whole counting means to count together both the rise and the fall of each one of the pulse signals of said wheel speed sensor, and a switching means to switch between said half counting means and said whole counting means, wherein said switching means switches to said whole counting means at the first count after the starting point of the calculation cycle, and said switching means switches to said half counting means which counts signals whose direction is constant with the rise or the fall of the pulse signals counted last in the previous calculation cycle, when the number of counts becomes more than a certain number in the current calculation cycle and switches back to said whole counting means when the number of counts becomes less than the certain number.

5. A wheel speed measuring apparatus as claimed in claim 4, wherein the wheel speed is calculated by correcting the number of counts in the current cycle from the counting of the previous cycle and the current cycle and by multiplying a rectilinear distance of the vehicle relating to one count of the current cycle by the corrected number of counts when said wheel speed is lower than the certain amount and multiplying a doubled rectilinear distance of the vehicle relating to one count of the current cycle by the corrected number of counts when said wheel speed is higher than the certain amount.

* * * * *